United States Patent
Tsirkin (10) Patent No.: US 10,127,064 B2
(45) Date of Patent: Nov. 13, 2018

(54) READ-ONLY VM FUNCTION CHAINING FOR SECURE HYPERVISOR ACCESS

(71) Applicant: Red Hat Israel, Ltd., Raanana (IL)

(72) Inventor: Michael S. Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 143 days.

(21) Appl. No.: 14/630,622

(22) Filed: Feb. 24, 2015

(65) Prior Publication Data

US 2016/0246633 A1 Aug. 25, 2016

(51) Int. Cl.
| | |
|---|---|
| G06F 9/455 | (2018.01) |
| G06F 3/06 | (2006.01) |
| G06F 12/02 | (2006.01) |
| G06F 12/14 | (2006.01) |

(52) U.S. Cl.
CPC ........ *G06F 9/45558* (2013.01); *G06F 3/0622* (2013.01); *G06F 3/0637* (2013.01); *G06F 3/0664* (2013.01); *G06F 3/0673* (2013.01); *G06F 12/02* (2013.01); *G06F 12/1458* (2013.01); *G06F 2009/45583* (2013.01); *G06F 2009/45587* (2013.01)

(58) Field of Classification Search
CPC .... G06F 3/0664; G06F 3/0673; G06F 3/0622; G06F 2009/45583; G06F 2009/45558; G06F 3/0637; G06F 9/45558; G06F 12/02; G06F 12/1458; G06F 2009/45587
See application file for complete search history.

(56) References Cited

U.S. PATENT DOCUMENTS

| | | | |
|---|---|---|---|
| 8,656,482 B1* | 2/2014 | Tosa | H04L 63/08 713/153 |
| 2013/0042238 A1 | 2/2013 | Cardona et al. | |
| 2013/0276057 A1 | 10/2013 | Smith et al. | |
| 2014/0013326 A1 | 1/2014 | Neiger et al. | |
| 2014/0189690 A1 | 7/2014 | Ramakrishnan | |
| 2014/0245430 A1* | 8/2014 | Vipat | G06F 9/45533 726/17 |
| 2014/0283056 A1 | 9/2014 | Bachwani et al. | |
| 2015/0013008 A1* | 1/2015 | Lukacs | G06F 21/53 726/24 |

(Continued)

OTHER PUBLICATIONS

Jun Nakajima et al., "Extending KVM Models Toward High-Performance NFV," Intel Corporation, Oct. 14, 2014, [retrieved Dec. 1, 2014], 28 pages, Internet: <http://www.linux-kvm.org/wiki/images/1/1d/01x05-NFV.pdf>.

(Continued)

*Primary Examiner* — Jacob D Dascomb
(74) *Attorney, Agent, or Firm* — Lowenstein Sandler LLP (57) ABSTRACT

A hypervisor configures a first VM function component for execution on behalf of a virtual machine, the first VM function component to execute a second VM function component. The hypervisor then configures the second VM function for execution on behalf of the first VM function component, the second VM function component to execute at least one privileged instruction. The hypervisor receives a request from the virtual machine to execute the first VM function component, and executes the first VM function component. The hypervisor then receives a request from the first VM function component to execute the second VM function component and executes the second VM function component.

20 Claims, 7 Drawing Sheets

(56) References Cited

U.S. PATENT DOCUMENTS

2015/0178497 A1* 6/2015 Lukacs ................. G06F 9/461
726/23
2015/0365322 A1* 12/2015 Shatzkamer ............ H04L 45/74
370/392

OTHER PUBLICATIONS

David Durham, Mitigating Exploits, Rootkits and Advanced Persistent Threats, Intel Corporation, Hot Chips Tutorial, 2014, [retrieved Dec. 1, 2014], 39 pages, Internet: <http://www.setphaserstostun.org/hc26/HC26-10-tutorial-epub/HC26.10-tutorial1-HW-Security-epub/HC26.10.145-5_HotChipsMitigating_Eploits6.pdf>.
Jun Nakajima, "Intel Update," Xen Summit, Intel Corporation, Aug. 27-28, 2012, [retrieved Dec. 1, 2014], 4 pages, Internet: <http://www.slideshare.net/xen_com_mgr/intel-update>.
Yasunori Goto, "Kernel-based Virtual Machine Technology," Fujitsu Sci. Tech. J., Jul. 2011, pp. 362-368, vol. 47, No. 3, Internet: <http://192.240.0.102/downloads/MAG/vol47-3/paper18.pdf>.

* cited by examiner

READ-ONLY VM FUNCTION CHAINING FOR SECURE HYPERVISOR ACCESS

TECHNICAL FIELD

The present disclosure is generally related to computer systems, and more particularly, to secure execution of VM Functions in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system." In some implementations, the hypervisor can configure a particular function with special privileges to be executed on behalf of a virtual machine without requiring an exit to the hypervisor. This is referred to as a "VM function."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for read-only VM function chaining for secure hypervisor access. In a virtualized environment, a hypervisor may configure a VM function with special privileges to be executed on behalf of a virtual machine (e.g., to allow one virtual machine to communicate directly with another virtual machine without requiring an exit to the hypervisor). The VM function can provide a virtual machine with the ability to modify an otherwise inaccessible part of hypervisor memory without requiring an exit (transition of control) to the hypervisor. However, this can result in security issues since it may not be safe to give a virtual machine unrestricted access to modify hypervisor memory. For example, invalid or unexpected input provided by the virtual machine to the VM function could corrupt writeable hypervisor memory. This can put an entire virtualized environment at risk.

Aspects of the present disclosure address the above noted deficiency by implementing a secure gateway for executing a VM function on behalf of a virtual machine. Two VM functions may be created. The first VM function can be configured so that it has no extra privileges except those required to execute the second VM function. The second VM function can be configured with the extra privileges and so that it may only be invoked by the first VM function. Any attempt by a virtual machine to execute the second VM function directly can result in an error, which can improve the security of the virtualized environment.

In an illustrative example, a hypervisor can configure a first VM function component for execution on behalf of a virtual machine. A VM function component can be a function, module, or other portion of code that is exposed by the hypervisor to the guest operating system of a virtual machine for execution with additional privileges (e.g., sending requests directly to a memory space that is accessible by another virtual machine). In some implementations, a VM function component may be configured using different "views" of memory, meaning the hypervisor can grant the VM function component different access authority to hypervisor memory than would otherwise be granted to a virtual machine outside of the VM function component code. For example, the VM function component may be granted write access to hypervisor memory whereas all other components of the virtual machine may only be able to read hypervisor memory, if access is provided at all. To switch between "views" of memory, a VM function component may need to share one or more memory pages with the component of the virtual machine that invokes the VM function. The shared memory pages may contain executable code that can facilitate altering how memory is viewed by the executing VM function. For example, the shared memory page can change the VM function's view of memory from read-only to writeable.

The first VM function component can be configured so that it only has the authority to execute a second VM function component. In certain implementations, the hypervisor may configure the first VM function component by loading a first memory page in hypervisor memory to be shared between the virtual machine and the first VM function component. The first memory page (or a portion of the first memory page) can contain executable code that can switch the first VM function's view of hypervisor memory to be read-only. The hypervisor may then associate the first memory page with the virtual machine and the first VM function component. The hypervisor can associate the first memory page with the virtual machine by using a register space, shared memory space in hypervisor memory, an extended page table pointer (EPTP), or the like. An EPTP can provide a mapping between the guest physical memory address within a virtual machine to the associated host physical address within hypervisor memory.

Subsequently, the hypervisor may grant authority to execute the code stored in a portion of the first memory page to the first VM function component. Thus, the first VM function component may not have the authority to modify memory, but may only have the authority to receive the input provided by the virtual machine, and subsequently invoke a second VM function component to execute a privileged instruction using the input provided by the virtual machine. The input may be transferred by the virtual machine to the first VM function component (and subsequently between the first and second VM function components) using a shared memory space, a data structure in a data store, using the processor registers associated with the virtual CPU of the virtual machine, or in any similar manner.

The hypervisor may then configure a second VM function component for execution on behalf of the first VM function component. The second VM function component can be configured to execute at least one privileged instruction. A privileged instruction may be an instruction that operates on an area of hypervisor memory that requires special access privileges (e.g., a privileged area of hypervisor memory). In certain implementations, the hypervisor may configure the second VM function component by loading a second memory page in hypervisor memory to be shared between the first VM function component and the second VM function component. The second memory page (or a portion of the second memory page) can contain executable code that can switch the second VM function's view of hypervisor memory to be writeable by the second VM function. The hypervisor may then associate the second memory page with the first VM function component and the second VM function component. The hypervisor can associate the second memory page with the first and second VM function components using a register space, shared memory space in hypervisor memory, an extended page table pointer (EPTP), or the like. The hypervisor may then grant authority to execute the code stored in a portion of the second memory page to the second VM function component so that the second VM function component may modify hypervisor memory if necessary. Subsequently, the hypervisor may grant the second VM function component access to execute a privileged instruction or functionality.

Once both VM function components are configured, the hypervisor may then supply the first VM function component to the virtual machine for execution. In an illustrative example, the virtual machine may execute a command to start the first VM function component (e.g., a VMFUNC command), which can subsequently send a request to the hypervisor to initiate execution of the VM function without an exit. The hypervisor can receive the request from the virtual machine and subsequently initiate the execution of the first VM function component on behalf of the virtual machine.

The hypervisor, executing the first VM function component on behalf of the virtual machine, may first receive input from the virtual machine. The input may be received using a shared memory space, a data structure in a data store, using the processor registers associated with the virtual CPU of the virtual machine, or in any similar manner. The received input can include user generated input, output from another component of the virtual machine, states of memory, CPU flags (e.g., whether interrupts are enabled or disabled), register values, etc. Once received, the first VM function component can validate the input prior to invoking the second VM function component. To validate the input, the first VM function component may compare the received input to known valid values, may determine whether the input is in general recognized format (e.g., valid numerical values), or in any similar manner.

Upon determining that the input received from the virtual machine is valid, the first VM function component may invoke the second VM function component. In certain implementations, the first VM function component may send a request to the hypervisor to execute the second VM function component. Alternatively, the first VM function component may invoke the second VM function component using an interface (e.g., application program interface (API), application binary interface (ABI), etc.). If the first VM function component determines that the input from the virtual machine is not valid, the first VM function may return an error to the virtual machine. Alternatively, the first VM function may modify the invalid input to place it in a valid state then subsequently invoke the second VM function component.

The hypervisor can receive the request from the first VM function component and subsequently initiate the execution of the second VM function component on behalf of the first VM function component. The hypervisor, executing the second VM function component on behalf of the first VM function component, may receive the validated input from the virtual machine. The second VM function component may then write the validated input to a writable area of hypervisor memory and subsequently execute at least one privileged instruction or function on behalf of the virtual machine using the validated input. If the hypervisor receives a request from the virtual machine to execute the second VM function component directly (without invoking the first VM function component), the hypervisor can return an error to the virtual machine.

Aspects of the present disclosure are thus capable of facilitating VM function chaining for secure hypervisor access. More particularly, aspects of the present disclosure can prevent a virtual machine from corrupting hypervisor memory with unexpected input provided to a VM function component of the hypervisor.

Figure 1:
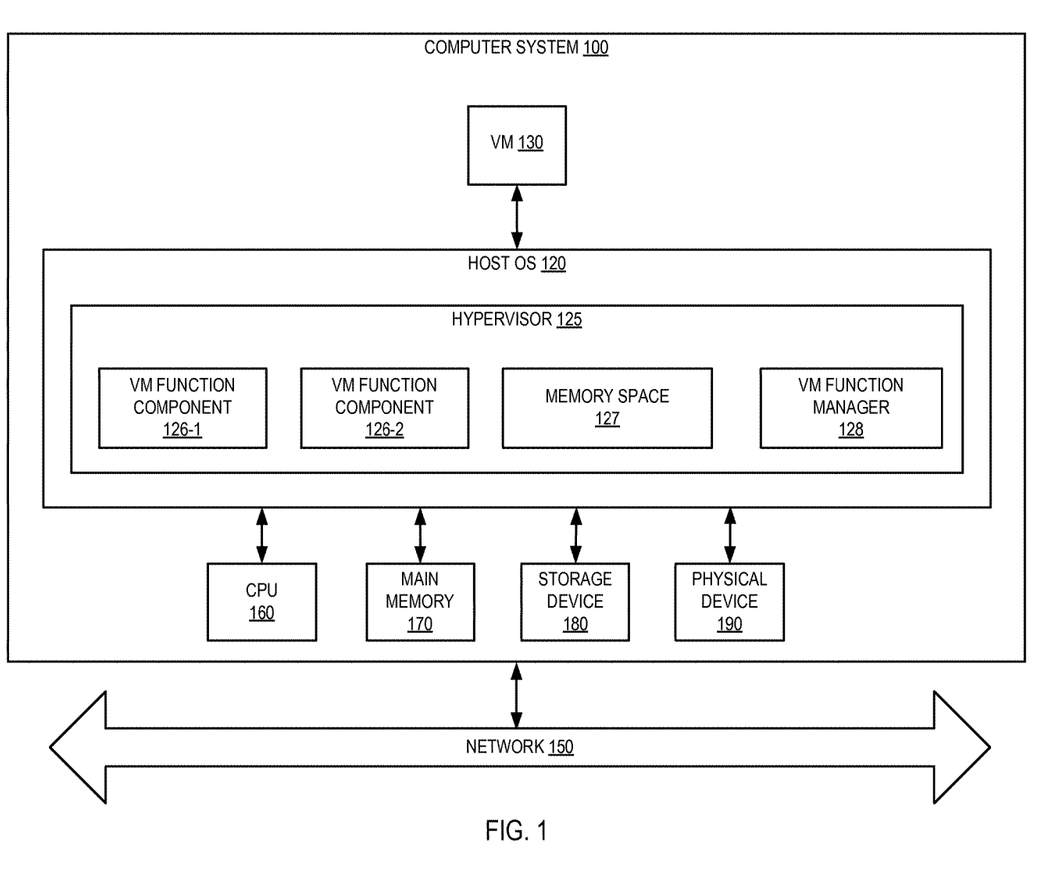
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more physical devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, a single CPU is depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more virtual machine (VM) 130 and host operating system (OS) 120. VM 130 is a software implementation of a machines that executes programs as though it was an actual physical machine. Host OS 120 manages the hardware resources of the computer system and provides functions such as inter-process communication, scheduling, memory management, and so forth.

VM 130 may comprise a guest operating system (not shown) that handles the execution of applications within the virtual machine, and one or more virtual processors (not shown). It should be noted that although, for simplicity, a single source VM 130 is depicted in FIG. 1, computer system 100 may host a plurality of each.

Host OS 120 may comprise a hypervisor 125, which provides a virtual operating platform for VM 130 and manages its execution. Hypervisor 125 may comprise VM function component 126-1, VM function component 126-2, memory space 127, and VM function manager 128. It should be noted that in some alternative implementations, hypervisor 125 may be external to host OS 120, rather than embedded within host OS 120, or may replace host OS 120.

VM function component 126-1 and VM function component 126-2 can each be composed of a portion of code that is exposed by the hypervisor to the guest OS of VM 130 for execution with special privileges. VM function component 126-1 can be configured by the VM function manager 128 component of hypervisor 125 so that it only has privileges to invoke VM function component 126-2 as described in detail below with respect to FIGS. 2-3. VM function component 126-2 can be configured by the VM function manager 128 component of hypervisor 125 to execute at least one privileged instruction as described in detail below with respect to FIGS. 2-4.

VM function manager 128 can facilitate VM Function chaining for secure hypervisor access by configuring VM function component 162-1 and VM function component 126-2 on behalf of source VM 130, as described in detail below with respect to FIGS. 2-4. Memory space 127 can be an area of memory accessible to destination VM 130 to which VM function 128 may input data to be received by VM function component 126-1 (e.g., a shared memory space, an area of memory that maintains VCPU processor registers, etc.). Memory space 127 may also be used by VM function component 126-1 and VM function component 126-2 to communicate between them. Memory space 127 may also comprise memory pages containing executable code that can be used by VM function component 126-1 and VM function component 126-2 during execution.

Figure 2A:
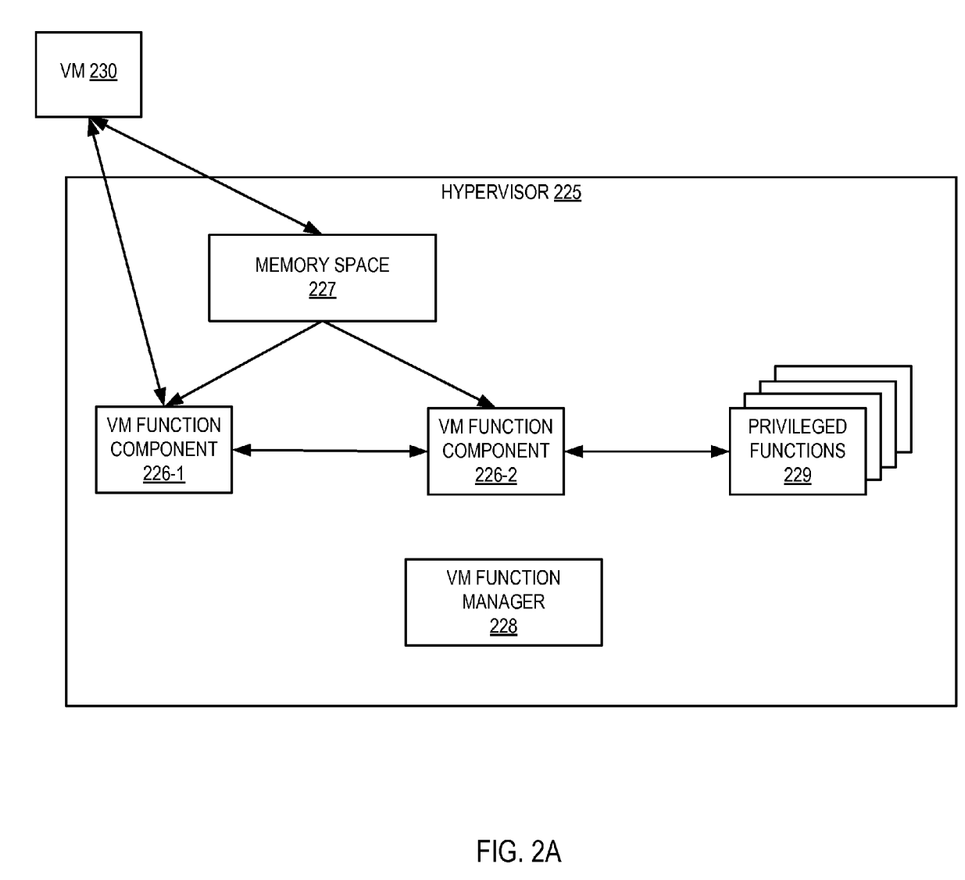
FIG. 2A depicts a block diagram of VM Function chaining, in accordance with one or more aspects of the present disclosure.

FIG. 2A depicts a block diagram of VM Function chaining, in accordance with one or more aspects of the present disclosure. As shown in FIG. 2A, hypervisor 225 can comprise VM function component 226-1, VM function component 226-2, memory space 227, VM function manager 228, and privileged functions 229. VM function manager 228 can configure VM function component 226-1 for execution on behalf of VM 230 so that it only has privileges to invoke VM function component 226-2. VM function manager 228 may supply VM function 226-1 to VM 230 for execution once configured. VM function manager 288 may also configure VM function module 226-2 for execution on behalf of VM function component 226-1 to execute at least one of privileged functions 229.

VM 230 may send a request to hypervisor 225 to execute VM function component 226-1. In some implementations, VM 230 may execute a command to start the VM function component 226-1 (e.g., a VMFUNC command), which can subsequently send a request to the hypervisor to initiate execution of VM function component 226-1 without an exit. The hypervisor can receive the request from the virtual machine and subsequently initiate the execution of VM function component 226-1 on behalf of VM 230. VM 230 may use memory space 227 to transfer input to VM function component 226-1. VM function component 226-1 can be configured so that it only has read only access to memory space 227 to prevent VM function component 226-1 from writing invalid input to hypervisor memory.

VM function component 226-1 may receive the input from VM 230 and validate it. Upon determining that the received input is valid, VM function component 226-1 may subsequently invoke VM function component 226-2. In certain implementations, VM function component 226-1 may send a request to the hypervisor to execute VM function component 226-2. Alternatively, VM function component 226-1 may invoke VM function component 226-2 using an interface (e.g., application program interface (API), application binary interface (ABI), etc.). VM function component 226-2 may receive the validated input from VM function component 226-1, write it to memory space 227, and execute at least one of privileged functions 229. Privileged functions 229 may comprise one or more instructions or functions that operate on an area of hypervisor memory that requires special access privileges (e.g., a privileged area of hypervisor memory).

Figure 2B:
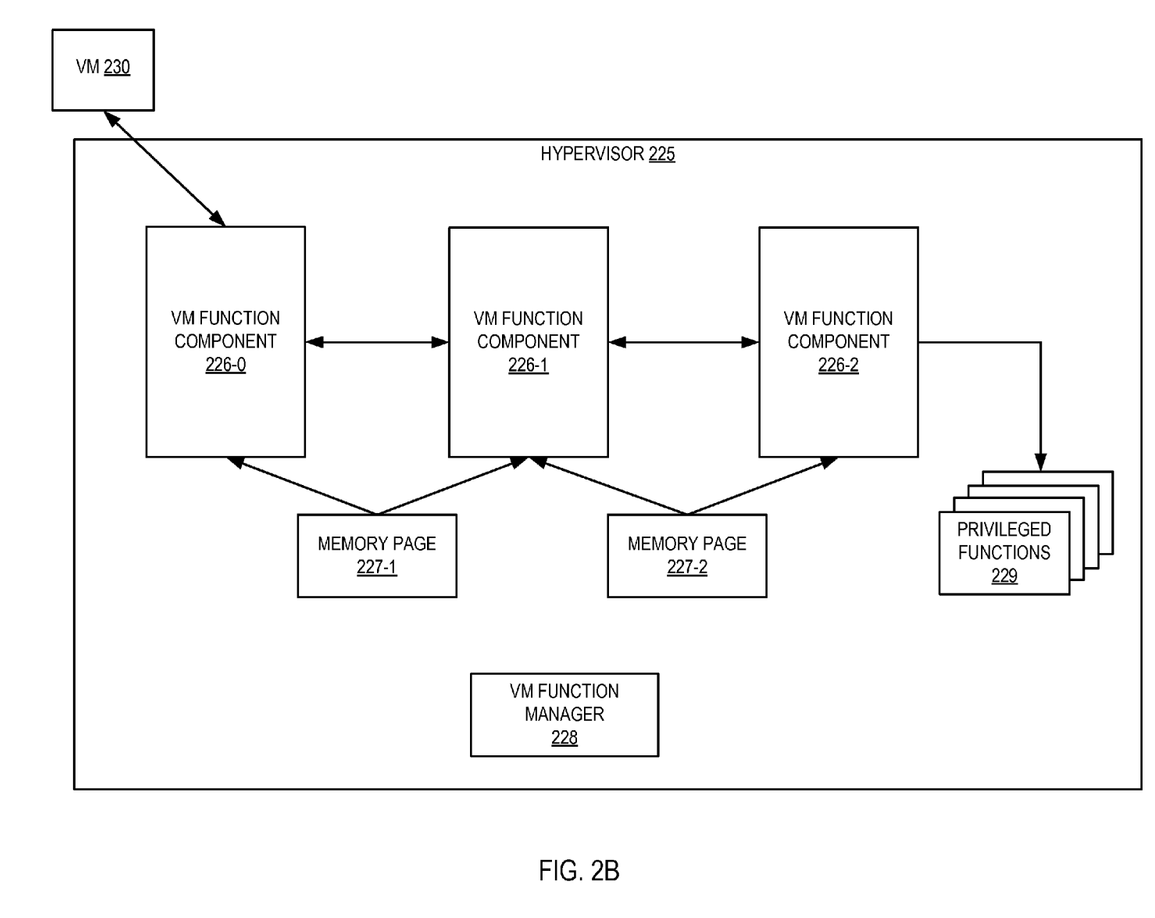
FIG. 2B depicts a block diagram of VM Function chaining using shared memory pages, in accordance with one or more aspects of the present disclosure.

FIG. 2B depicts a block diagram of VM Function chaining using shared memory pages, in accordance with one or more aspects of the present disclosure. As shown in FIG. 2B, hypervisor 225 can comprise VM function component 226-0, VM function component 226-1, VM function component 226-2, memory page 227-1, memory page 227-2, VM function manager 228, and privileged functions 229. VM function manager 228 can configure VM function component 226-1 for execution on behalf of VM 230 so that it only has privileges to invoke VM function component 226-2. VM function manager 228 may supply VM function 226-1 to VM 230 for execution once configured. VM function manager 288 may also configure VM function module 226-2 for execution on behalf of VM function component 226-1 to execute at least one of privileged functions 229.

As shown in FIG. 2B, VM function components can be configured using different "views" of memory, meaning hypervisor 225 can grant the VM function components different access authority to hypervisor memory than would otherwise be granted to a virtual machine outside of the VM function component code. For example, a VM function component may be granted write access to hypervisor memory whereas all other components of the virtual machine may only be able to read hypervisor memory, if access is provided at all. To switch between "views" of memory, a VM function component may need to share one or more memory pages (e.g., one of memory pages 227) with the component that invokes the VM function component in order to transfer data. Memory pages 227 may comprise executable code that can facilitate altering how memory is viewed by the executing VM function component. For example, memory page 227-1 can set VM function component 226-1's view of memory to read-only. Similarly, memory page 227-2 can set VM function component 226-2's view of memory to writable.

VM 230 may send a request to VM function manager 228 to execute VM function component 226-1. VM function component 226-0 can represent the component of VM 230 that invokes VM function component 226-1. Thus, VM function component 226-0 accesses VM 230's regular or standard view of hypervisor 225 memory. VM function component 226-0 may send a request to VM function manager 228 to execute VM function component 226-1 (e.g., by executing the code from memory page 227.1). VM function component 226-0 may execute a command to start the VM function component 226-1 (e.g., a VMFUNC command), which can subsequently send a request to VM function manager 228 to initiate execution of VM function component 226-1 without an exit. VM function manager 228 can receive the request from VM function component 226-0 and subsequently initiate the execution of VM function component 226-1 on behalf of VM function component 226-0 by switching to a read only view of hypervisor 225 memory using the code from memory page 227-1. VM function component 226-1 can be configured so that it only has read only access to hypervisor 225 memory to prevent VM function component 226-1 from writing invalid input to hypervisor 225 memory.

VM function component 226-1 may receive the input from VM function component 226-0 and validate it. Upon determining that the received input is valid, VM function component 226-1 may subsequently invoke VM function component 226-2. VM function component 226-1 may send a request to VM function manager 228 to execute VM function component 226-2. VM function manager 228 can receive the request from the VM function component 226-1 and subsequently initiate the execution of VM function component 226-2 on behalf of VM function component 226-1 by switching to a writable view of hypervisor 225 memory using the code from memory page 227-2. VM function component 226-2 may receive the validated input from VM function component 226-1, write it to memory page 227-2, and execute at least one of privileged functions 229. Privileged functions 229 may comprise one or more instructions or functions that operate on an area of hypervisor memory that requires special access privileges (e.g., a privileged area of hypervisor memory).

Figure 3:
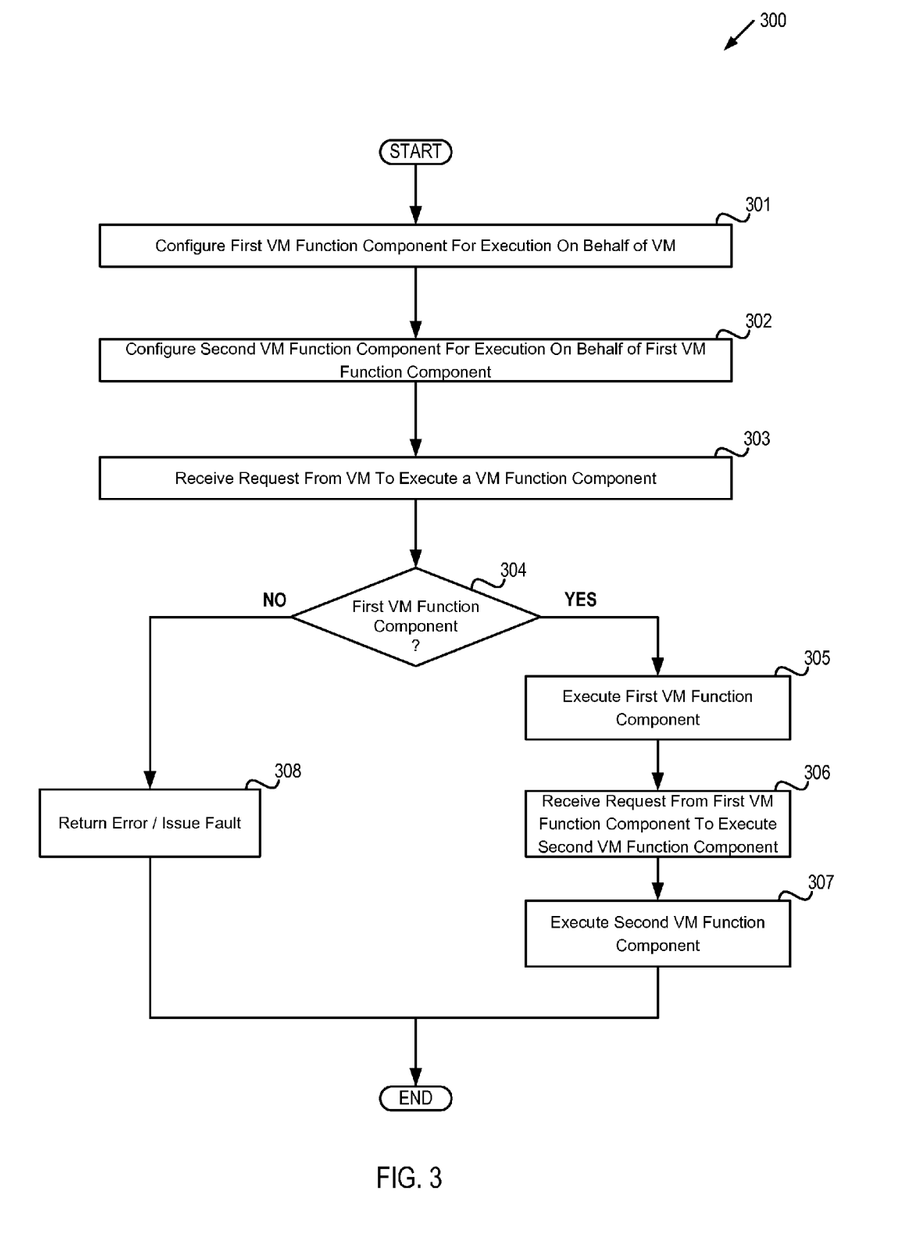
FIG. 3 depicts a flow diagram of a method for VM Function chaining for secure hypervisor access, in accordance with one or more aspects of the present disclosure.

FIG. 3 depicts a flow diagram of an example method 300 for VM Function chaining for secure hypervisor access. The method may be performed by processing logic that may comprise hardware (circuitry, dedicated logic, etc.), software (such as is run on a general purpose computer system or a dedicated machine), or a combination of both. In one illustrative example, method 300 may be performed by VM function manager 128 of hypervisor 125 in FIG. 1. Alternatively, some or all of method 300 might be performed by another module or machine. It should be noted that blocks depicted in FIG. 3 could be performed simultaneously or in a different order than that depicted.

At block 301, processing logic can configure a first VM function component for execution on behalf of a virtual machine. The first VM function component can be configured so that it only has the authority to execute a second VM function component. In certain implementations, the processing logic may configure the first VM function component by loading a first memory page in hypervisor memory to be shared between the virtual machine and the first VM function component. The first memory page (or a portion of the first memory page) can contain executable code that can switch the first VM function's view of hypervisor memory to be read-only. Processing logic may then associate the first memory page with the virtual machine and the first FM function component. Processing logic can associate the memory page with the virtual machine by using a register space, shared memory space in hypervisor memory, an extended page table pointer (EPTP), or the like. Subsequently, processing logic may grant authority to execute the code stored in a portion of the first memory page to the first VM function component. Thus, the first VM function component may not have the authority to modify memory, but may only have the authority to read the input provided by the virtual machine, and subsequently invoke a second VM function component to execute a privileged instruction using the input provided by the virtual machine.

At block 302, processing logic can configure a second VM function component for execution on behalf of the first VM function component. The second VM function component can be configured to execute at least one privileged instruction. A privileged instruction may be an instruction that operates on an area of hypervisor memory that requires special access privileges (e.g., a privileged area of hypervisor memory). In certain implementations, processing logic may configure the second VM function component by loading a second memory page in hypervisor memory to be shared between the first VM function component and the second VM function component. The second memory page (or a portion of the second memory page) can contain executable code that can switch the second VM function's view of hypervisor memory to be writeable by the second VM function. Processing logic may then associate the second memory page with the first VM function component and the second VM function component. Processing logic can associate the memory page with the first and second VM function components using a register space, shared memory space in hypervisor memory, an extended page table pointer (EPTP), or the like. Processing logic may then grant authority to execute the code stored in a portion of the second memory page to the second VM function component so that the second VM function component may modify memory if necessary. Subsequently, processing logic may grant the second VM function component access to execute a privileged instruction or functionality.

At block 303, processing logic can receive a request from the virtual machine to execute a VM function component. At block 304, processing logic determines whether the request from the virtual machine is to execute the first VM function component. If so, processing continues to block 305. Otherwise, processing logic proceeds to block 308.

At block 305, processing logic executes the first VM function component on behalf of the virtual machine. In an illustrative example, processing logic may execute the first VM function component as described in further detail below with respect to FIG. 4.

At block 306, processing logic receives a request from the first VM function component to execute the second VM function component. At block 307, processing logic executes the second VM function component on behalf of the first VM function component. In an illustrative example, processing logic may execute the second VM function component as described in further detail below with respect to FIG. 5. After block 307, the method of FIG. 3 terminates If at block 304, processing logic determines that the request from the virtual machine is to execute a VM function component other than the first VM function component (e.g., if the virtual machine requests execution of the second VM function component directly), processing logic proceeds to block 308. At block 308, processing logic can return an error or issue a fault, indicating that the virtual machine does not have authority to execute the VM function component it requested. After block 308, the method of FIG. 3 terminates.

Figure 4:
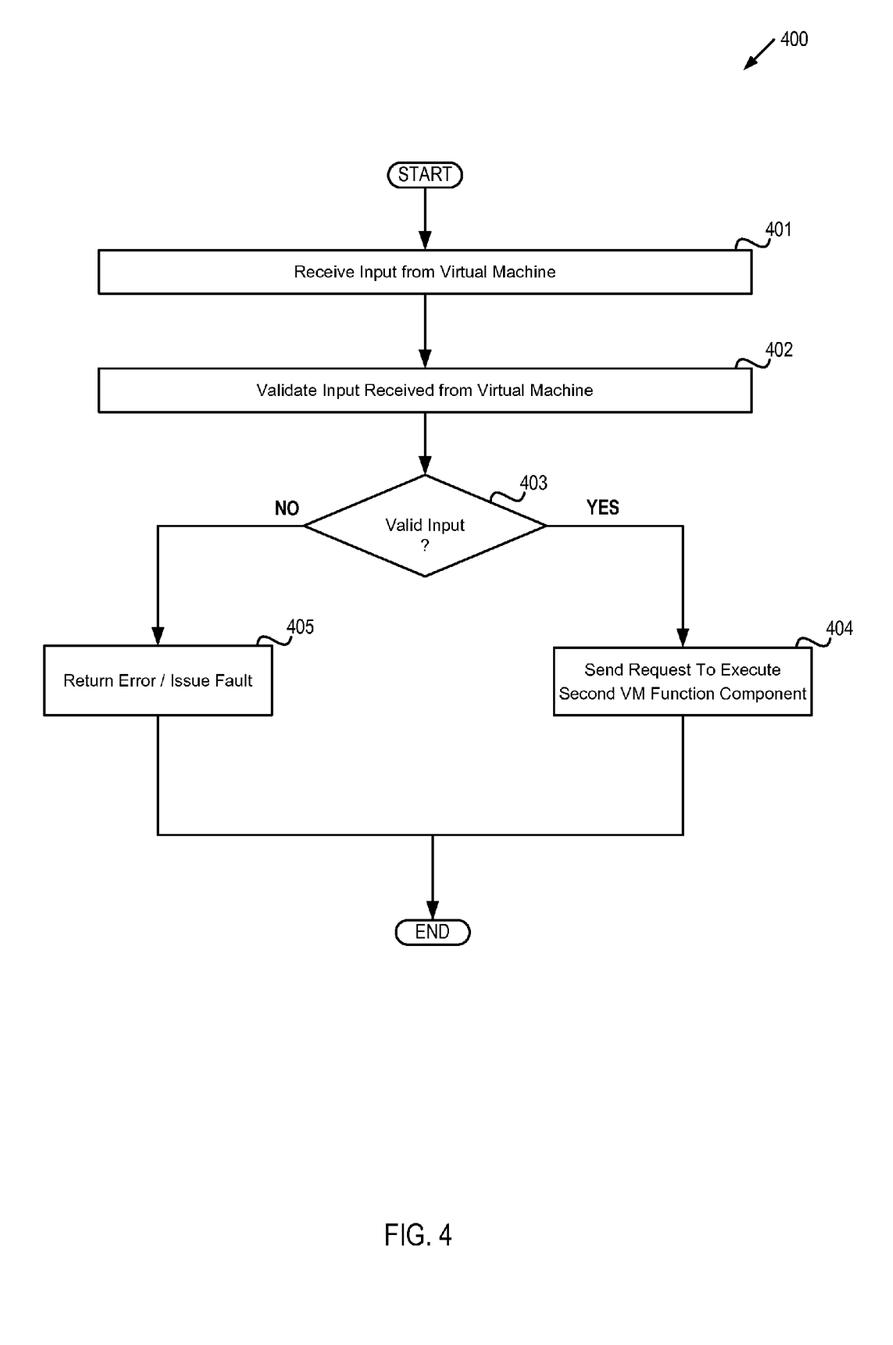
FIG. 4 depicts a flow diagram of a method for executing a first VM Function, in accordance with one or more aspects of the present disclosure.

FIG. 4 depicts a flow diagram of an example method 400 for executing a first VM function. The method may be performed by processing logic that may comprise hardware (circuitry, dedicated logic, etc.), software (such as is run on a general purpose computer system or a dedicated machine), or a combination of both. In one illustrative example, method 400 may be performed by VM function manager 128 of hypervisor 125 in FIG. 1. Alternatively, some or all of method 400 might be performed by another module or machine. It should be noted that blocks depicted in FIG. 4 could be performed simultaneously or in a different order than that depicted.

At block 401, processing logic can receive input from the virtual machine. The input may be received using a shared memory space, a data structure in a data store, using the processor registers associated with the virtual CPU of the virtual machine, or in any similar manner. The received input can include user generated input, output from another component of the virtual machine, states of memory, CPU flags (e.g., whether interrupts are enabled or disabled), register values, etc.

At block 402, processing logic can validate the input received from the virtual machine. To validate the input, processing logic may compare the received input to known valid values, may determine whether the input is in general recognized format (e.g., valid numerical values), or in any similar manner. At block 403, processing logic branches based on the results of the validation at block 402. Upon determining that the input is valid, processing proceeds to block 404. At block 404, processing logic sends a request to execute the second VM function component. After block 404, the method of FIG. 4 terminates.

If at block 403, processing logic determines that the input is invalid, processing proceeds to block 405, where processing logic can return an error or issue a fault to the virtual machine. After block 405, the method of FIG. 4 terminates.

Figure 5:
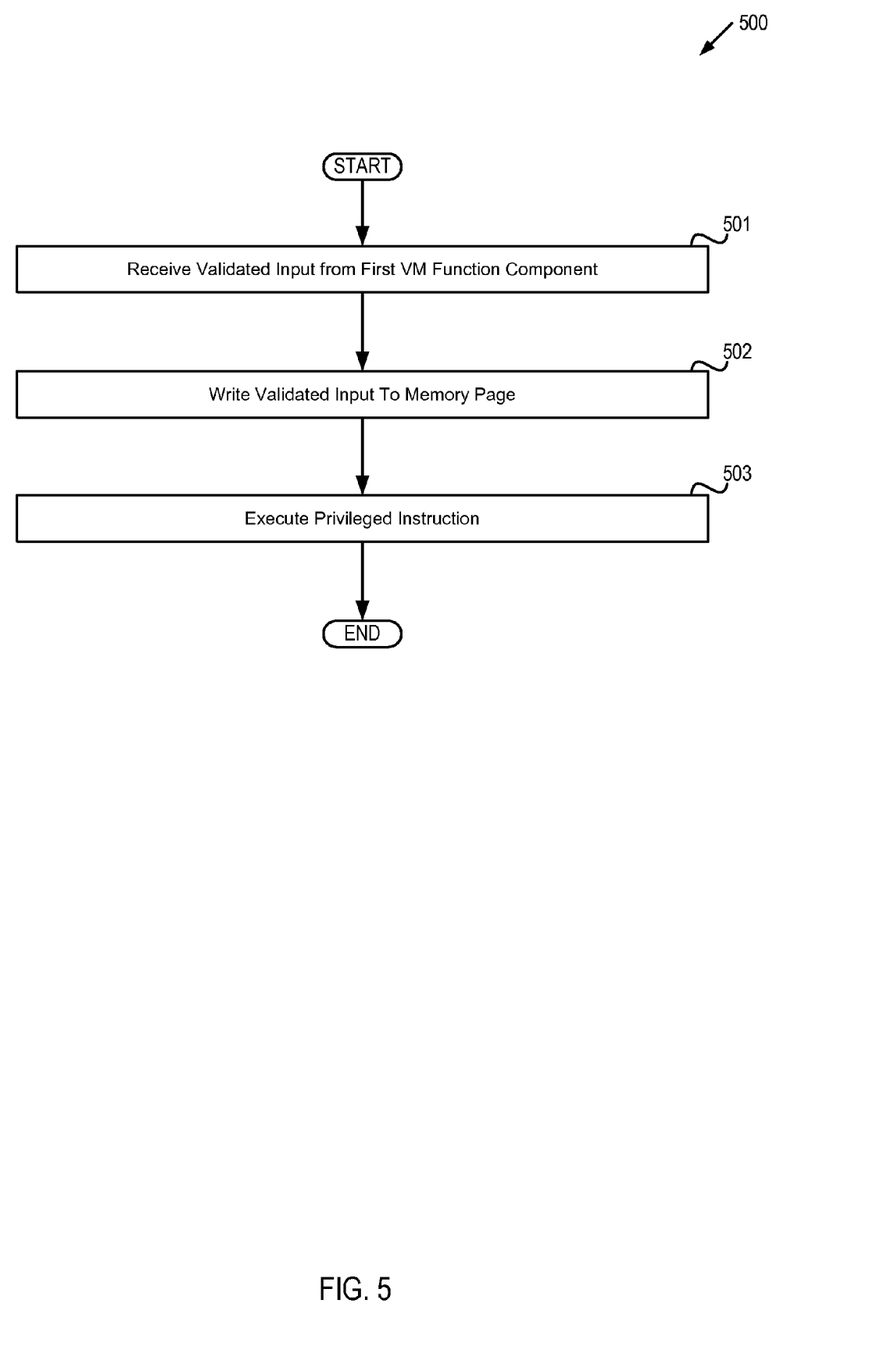
FIG. 5 depicts a flow diagram of a method for executing a second VM Function, in accordance with one or more aspects of the present disclosure.

FIG. 5 depicts a flow diagram of an example method 500 for executing a second VM function. The method may be performed by processing logic that may comprise hardware (circuitry, dedicated logic, etc.), software (such as is run on a general purpose computer system or a dedicated machine), or a combination of both. In one illustrative example, method 500 may be performed by VM function manager 128 of hypervisor 125 in FIG. 1. Alternatively, some or all of method 500 might be performed by another module or machine. It should be noted that blocks depicted in FIG. 5 could be performed simultaneously or in a different order than that depicted.

At block 501, processing logic can receive the validated input from the first VM function component. At block 502, processing logic can write the validated input to component writable area of hypervisor memory. At block 503, processing logic can execute the privileged instruction or function. After block 503, the method of FIG. 5 terminates.

Figure 6:
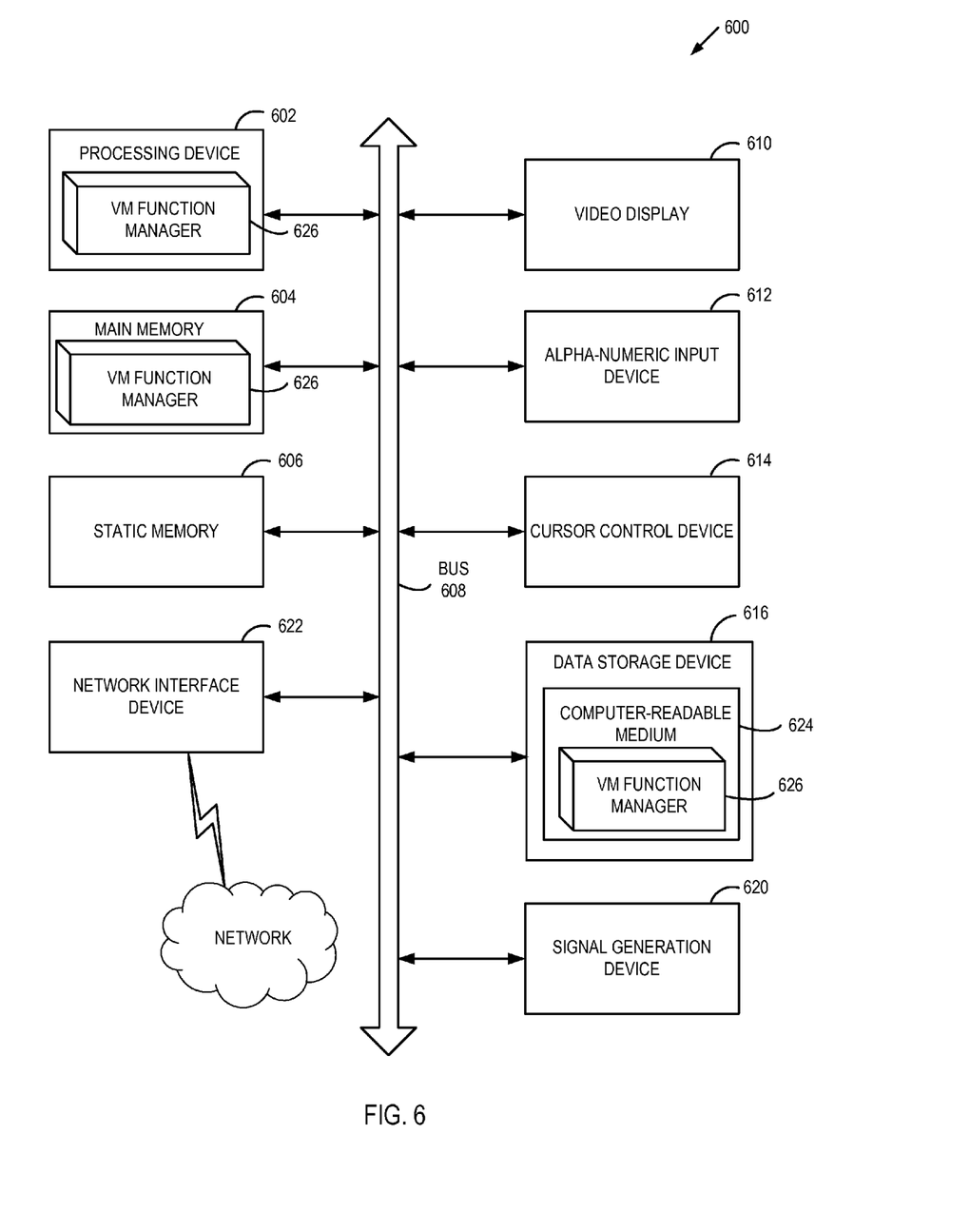
FIG. 6 depicts a block diagram of an illustrative computer system operating in accordance with examples of the invention.

FIG. 6 depicts an example computer system 600 which can perform any one or more of the methods described herein. In one example, computer system 600 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute VM function manager 626 for performing the operations and steps discussed herein (e.g., corresponding to the methods of FIGS. 3-5, etc.).

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker). In one illustrative example, the video display unit 610, the alphanumeric input device 612, and the cursor control device 614 may be combined into a single component or device (e.g., an LCD touch screen).

The data storage device 616 may include a computer-readable medium 624 on which is stored VM function manager 626 (e.g., corresponding to the methods of FIGS. 3-5, etc.) embodying any one or more of the methodologies or functions described herein. VM function manager 626 may also reside, completely or at least partially, within the main memory 604 and/or within the processing device 602 during execution thereof by the computer system 600, the main memory 604 and the processing device 602 also constituting computer-readable media. VM function manager 626 may further be transmitted or received over a network via the network interface device 622.

While the computer-readable storage medium 624 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "receiving," "executing," "returning," "loading," "associating," "granting," "sending," "writing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:

configuring, by a processing device executing a hypervisor, a first VM function component in a memory of the hypervisor for execution on behalf of a virtual machine, the first VM function component to execute a second VM function component, wherein the first VM function component is configured with a read-only view of the memory of the hypervisor;

configuring, by the processing device executing the hypervisor, the second VM function component in a memory of the hypervisor to be invoked by the first VM function component, the second VM function component to execute at least one privileged instruction, wherein the at least one privileged instruction operates on and causes a modification of a privileged area of the memory of the hypervisor, and wherein the virtual machine does not have privileges to directly access the second VM function component;

receiving, by the hypervisor, a request from the virtual machine to execute the first VM function component;

executing, by the processing device executing the hypervisor, the first VM function component on behalf of the virtual machine;

receiving, by the hypervisor, a request from the first VM function component to execute the second VM function component;

executing, by the processing device executing the hypervisor, the second VM function component; and modifying the privileged area of the memory of the hypervisor based on execution of the at least one privileged instruction executed by the second VM function component.

2. The method of claim 1, further comprising:
responsive to receiving a request from the virtual machine to execute the second VM function component, returning an error to the virtual machine.

3. The method of claim 1, wherein configuring the first VM function component comprises:
loading a first memory page in hypervisor memory to be shared between the virtual machine and the first VM function component;
associating the first memory page with the virtual machine and the first VM function component; and
granting authority to execute code stored in a portion of the first memory page to the first VM function component.

4. The method of claim 3, wherein configuring the second VM function component comprises:
loading a second memory page in hypervisor memory to be shared between the first VM function component and the second VM function component;
associating the second memory page with the first VM function component and the second VM function component;
granting authority to execute code stored in a portion of the second memory page to the second VM function component; and
granting the second VM function component authority to execute the at least one privileged instruction.

5. The method of claim 4, wherein the at least one privileged instruction comprises at least one instruction to access hypervisor memory, and wherein configuring the second VM function component further comprises granting write access to the hypervisor memory.

6. The method of claim 1, wherein the first VM function component is to:
receive input from the virtual machine;
validate the input received from the virtual machine;
responsive to determining that the input received from the virtual machine is valid, send a request to execute the second VM function component.

7. The method of claim 1 wherein the second VM function component is to:
receive the validated input from the first VM function component;
writing the validated input to a writable area of hypervisor memory; and
executing the at least one privileged instruction on behalf of the virtual machine.

8. A computing apparatus comprising:
a memory; and
a processing device, operatively coupled to the memory, to execute a hypervisor to:

configure a first VM function component in a memory of the hypervisor for execution on behalf of a virtual machine, the first VM function component to execute a second VM function component, wherein the first VM function component is configured with a read-only view of the memory of the hypervisor;

configure the second VM function component in a memory of the hypervisor to be invoked by the first VM function component, the second VM function component to execute at least one privileged instruction, wherein the at least one privileged instruction operates on and causes a modification of a privileged area of the memory of the hypervisor, and wherein the virtual machine does not have privileges to directly access the second VM function component;

receive a request from the virtual machine to execute the first VM function component:

execute the first VM function component on behalf of the virtual machine;

receive a request from the first VM function component to execute the second VM function component;

execute the second VM function component; and modify the privileged area of the memory of the hypervisor based on execution of the at least one privileged instruction executed by the second VM function component.

9. The apparatus of claim 8, wherein the processing device is further to:
responsive to receiving a request from the virtual machine to execute the second VM function component, return an error to the virtual machine.

10. The apparatus of claim 8, wherein to configure the first VM function component, the processing device is to:
load a first memory page in hypervisor memory to be shared between the virtual machine and the first VM function component;
associate the first memory page with the virtual machine and the first VM function component; and
grant authority to execute code stored in a portion of the first memory page to the first VM function component.

11. The apparatus of claim 10, wherein to configure the second VM function component, the processing device is to:
load a second memory page in hypervisor memory to be shared between the first VM function component and the second VM function component;
associate the second memory page with the first VM function component and the second VM function component;
grant authority to execute code stored in a portion of the second memory page to the second VM function component; and
grant the second VM function component authority to execute the at least one privileged instruction.

12. The apparatus of claim 11, wherein the at least one privileged instruction comprises at least one instruction to access hypervisor memory, and wherein to configure the second VM function, the processing device is further to grant write access to the hypervisor memory.

13. The apparatus of claim 8, wherein to the first VM function component is to:
receive input from the virtual machine;
validate the input received from the virtual machine; and
responsive to determining that the input received from the virtual machine is valid, send a request to execute the second VM function component.

14. The apparatus of claim 8, wherein the second VM function component is to:

receive the validated input from the first VM function component;

write the validated input to a writable area of hypervisor memory; and execute the at least one privileged instruction on behalf of the virtual machine.

15. A non-transitory computer readable storage medium, having instructions stored therein, which when executed by a processing device of a computer system, cause the processing device to:

configure, by the processing device executing a hypervisor, a first VM function component in a memory of the hypervisor for execution on behalf of a virtual machine, the first VM function component to execute a second VM function component, wherein the first VM function component is configured with a read-only view of the memory of the hypervisor;

configure, by the processing device executing the hypervisor, the second VM function component in a memory of the hypervisor to be invoked by the first VM function component, the second VM function component to execute at least one privileged instruction, wherein the at least one privileged instruction operates on and causes a modification of a privileged area of the memory of the hypervisor, and wherein the virtual machine does not have privileges to directly access the second VM function component;

receive, by the hypervisor, a request from the virtual machine to execute the first VM function component;

execute, by the processing device executing the hypervisor, the first VM function component on behalf of the virtual machine;

receive, by the hypervisor, a request from the first VM function component to execute the second VM function component;

execute, by the processing device executing the hypervisor, the second VM function component; and modify the privileged area of the memory of the hypervisor based on execution of the at least one privileged instruction executed by the second VM function component.

16. The non-transitory computer readable storage medium of claim 15, wherein to configure the first VM function component the processing device is to:

load a first memory page in hypervisor memory to be shared between the virtual machine and the first VM function component;

associate the first memory page with the virtual machine and the first VM function component; and grant authority to execute code stored in a portion of the first memory page to the first VM function component.

17. The non-transitory computer readable storage medium of claim 16, wherein to configure the second VM function component the processing device is to:

load a second memory page in hypervisor memory to be shared between the first VM function component and the second VM function component;

associate the second memory page with the first VM function component and the second VM function component;

grant authority to execute code stored in a portion of the second memory page to the second VM function component; and grant the second VM function component authority to execute the at least one privileged instruction.

18. The non-transitory computer readable storage medium of claim 17, wherein the at least one privileged instruction comprises at least one instruction to access hypervisor memory, and wherein to configure the second VM function, the processing device is further to grant write access to the hypervisor memory.

19. The non-transitory computer readable storage medium of claim 15, wherein the first VM function component is to:

receive input from the virtual machine;

validate the input received from the virtual machine; and responsive to determining that the input received from the virtual machine is valid, send a request to execute the second VM function component.

20. The non-transitory computer readable storage medium of claim 15, wherein the second VM function component is to:

receive the validated input from the first VM function component;

write validated input to a writable area of hypervisor memory; and execute the at least one privileged instruction on behalf of the virtual machine.

* * * * *